US011503089B2

(12) United States Patent
Ramala (10) Patent No.: US 11,503,089 B2
(45) Date of Patent: Nov. 15, 2022

(54) METHOD AND SYSTEM FOR MANAGING USER ACCESS TO MULTIMEDIA CONTENT FOR ONLINE CONFERENCES USING METADATA

(71) Applicant: HCL Technologies Ltd, New Delhi (IN)

(72) Inventor: Santhakumari Ramala, Bangalore (IN)

(73) Assignee: HCL Technologies Ltd, Delhi (IN)

( * ) Notice: Subject to any disclaimer, the term of this patent is extended or adjusted under 35 U.S.C. 154(b) by 0 days.

(21) Appl. No.: 17/037,689

(22) Filed: Sep. 30, 2020

(65) Prior Publication Data

US 2021/0352121 A1 Nov. 11, 2021

(51) Int. Cl.
*H04L 65/402* (2022.01)
*G06N 20/00* (2019.01)
*G06F 16/48* (2019.01)
*H04L 65/4053* (2022.01)
*H04L 65/1089* (2022.01)

(52) U.S. Cl.
CPC .......... *H04L 65/4025* (2022.05); *G06F 16/48* (2019.01); *G06N 20/00* (2019.01); *H04L 65/1089* (2013.01); *H04L 65/4053* (2013.01)

(58) Field of Classification Search
CPC ......... H04N 7/15; H04N 21/84; H04N 21/482
See application file for complete search history.

(56) References Cited

U.S. PATENT DOCUMENTS

| | | | |
|---|---|---|---|
| 7,466,334 B1 | 12/2008 | Baba | |
| 9,230,241 B1 | 1/2016 | Singh et al. | |
| 9,679,567 B2 | 6/2017 | Doyle et al. | |
| 9,942,516 B1 | 4/2018 | Pell | |
| 10,021,454 B2 | 7/2018 | Fan et al. | |
| 10,440,325 B1 | 10/2019 | Boxwell et al. | |
| 2008/0263010 A1 | 10/2008 | Roychoudhuri et al. | |

(Continued)

FOREIGN PATENT DOCUMENTS

JP 6059318 B2 1/2017

OTHER PUBLICATIONS

Toni Heittola, "Audio context recognition using audio event histograms".

(Continued)

*Primary Examiner* — William G Trost, IV
*Assistant Examiner* — Christopher P Cadorna
(74) *Attorney, Agent, or Firm* — Kendal Sheets (57) ABSTRACT

A method and system for managing user access to a multimedia content for an online conference using metadata is disclosed. In some embodiments, the method includes identifying a plurality of contexts for each of a plurality of conference data streams extracted from the multimedia content. The method further includes generating a plurality of metadata types based on the plurality of contexts associated with each of the plurality of conference data streams, providing a plurality of options corresponding to the plurality of metadata types to a user for accessing a section of interest in the plurality of conference data streams, receiving at least one selected option from the plurality of options by the user and validating the user access to one or more of the plurality of conference data streams based on the at least one selected option and access rights associated with the user.

20 Claims, 7 Drawing Sheets

(56) References Cited

U.S. PATENT DOCUMENTS

| | | |
|---|---|---|
| 2015/0070516 A1 | 3/2015 | Shoemake et al. |
| 2016/0112740 A1* | 4/2016 | Francisco ........ H04N 21/44222 |
| | | 725/12 |
| 2016/0358632 A1 | 12/2016 | Lakhani et al. |
| 2018/0176508 A1* | 6/2018 | Pell ........................ H04N 19/85 |
| 2018/0255368 A1* | 9/2018 | Kasi ................... H04N 21/4882 |
| 2018/0343491 A1* | 11/2018 | Loheide ............. H04N 21/2387 |
| 2020/0267090 A1* | 8/2020 | Cahill ................. G06F 21/6218 |

OTHER PUBLICATIONS

Alexander Shropshire, "Capturing Context in Emotion AI: Innovations in Multimodal Video Sentiment Analysis".

* cited by examiner

METHOD AND SYSTEM FOR MANAGING USER ACCESS TO MULTIMEDIA CONTENT FOR ONLINE CONFERENCES USING METADATA

TECHNICAL FIELD

Generally, the invention relates to use of metadata for accessing online conference recordings. More specifically, the invention relates to method and system for managing user access to multimedia content for online conferences using metadata.

BACKGROUND

With increase in cross border communication and distribution of clients/teams across multiple geographies, there is an increasing need for a cost effective tool that enables seamless communication and integration between such teams, especially for corporates and big institutions. Online conferences or web-conferences are tools that are being widely used to provide teams/users with an integrated communication platform, which makes distant geographical locations of all participants redundant.

In an online conference, multiple users may remotely connect from different geographical locations using a client interface on their respective devices at any given time to enable data transmission amongst themselves. The data may include, but is not limited to video, documents (for example, word files, PPT, or slides), or audio. Thus, online conferences make communication easy and offer various advantages, such as, better communication, saving travel time and cost, amplification in productivity, and well-organized meetings. Most of the tools for online conferences also provide an option of recording the online conference, so that, the recorded conference may be accessed at any point in future based on a user requirement. Even users that may not have been present during the online conference may also be able to access conference data using the recorded conference.

However, because of the variation in the type of content, inclusion of multiple participants, and duration of such conferences, the conference recoding may be large in size. Additionally, an end user may only be interested in some specific sections of the conference recording, which are relevant to the end user. Some conventional systems and methods are available for providing access to specific portions of the conference data. However, these conventional systems and methods fail to provide user specific access to selected portions of the conference data.

There is therefore a need for a method and system that generates various metadata types for each of a plurality of contexts derived from conference data and automatically manages user access, by providing access to relevant portion of the conference data to the user.

SUMMARY OF INVENTION

In one embodiment, a method of managing user access to a multimedia content for an online conference using metadata is disclosed. The method may include identifying a plurality of contexts for each of a plurality of conference data streams extracted from the multimedia content based on at least one predefined data using a Machine Learning (ML) model. The method may further include generating a plurality of metadata types based on the plurality of contexts associated with each of the plurality of conference data streams. The method may further include providing a plurality of options corresponding to the plurality of metadata types to a user for accessing a section of interest in the plurality of conference data streams using the ML model. The method may further include receiving from the user, at least one selected option from the plurality of options. The method may further include validating the user access to one or more of the plurality of conference data streams based on the at least one selected option and access rights associated with the user. It should be noted that the access rights may be derived from an organization data.

In another embodiment, a system for managing user access to a multimedia content for an online conference using metadata is disclosed. The system may include a processor and a memory communicatively coupled to the processor. The memory may store processor-executable instructions, which, on execution, may causes the processor to identify a plurality of contexts for each of a plurality of conference data streams extracted from the multimedia content based on at least one predefined data, using a ML model. The processor-executable instructions, on execution, may further cause the processor to generate a plurality of metadata types based on the plurality of contexts associated with each of the plurality of conference data streams. The processor-executable instructions, on execution, may further cause the processor to provide a plurality of options corresponding to the plurality of metadata types to a user for accessing a section of interest in the plurality of conference data streams, using the ML model. The processor-executable instructions, on execution, may further cause the processor to receive from the user, at least one selected option from the plurality of options. The processor-executable instructions, on execution, may further cause the processor to validate the user access to one or more of the plurality of conference data streams based on the at least one selected option and access rights associated with the user. It may be noted that the access rights may be derived from an organization data.

In yet another embodiment, a non-transitory computer-readable medium storing computer-executable instruction for managing user access to a multimedia content for an online conference using metadata is disclosed. The stored instructions, when executed by a processor, may cause the processor to perform operations including identifying a plurality of contexts for each of a plurality of conference data streams extracted from the multimedia content based on at least one predefined data, using a ML model. The operations may further include generating a plurality of metadata types based on the plurality of contexts associated with each of the plurality of conference data streams. The operations may further include providing a plurality of options corresponding to the plurality of metadata types to a user for accessing a section of interest in the plurality of conference data streams, using the ML model. The operations may further include receiving from the user, at least one selected option from the plurality of options. The operations may further include validating the user access to one or more of the plurality of conference data streams based on the at least one selected option and access rights associated with the user. It may be noted that the access rights may be derived from an organization data.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hardwired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
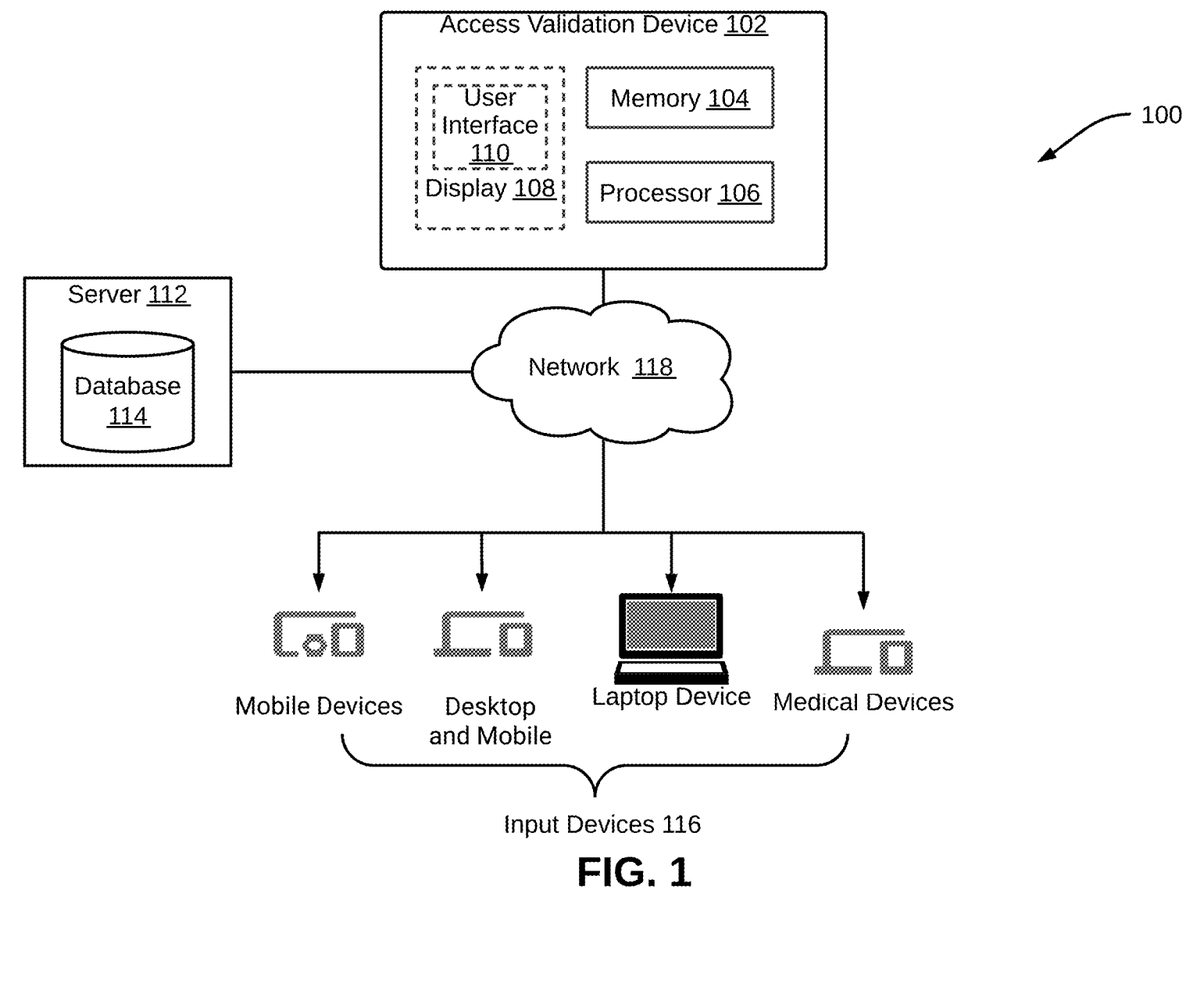
FIG. 1 is a block diagram illustrating a system for managing user access to a multimedia content for an online conference using metadata, in accordance with an embodiment.

Referring now to FIG. 1, a block diagram of an exemplary system 100 for managing user access to a multimedia content for an online conference using metadata is illustrated, in accordance with an embodiment. The system 100 may include an access validation device 102 that manages user access to the multimedia content associated with the online conference. The multimedia content, for example, may include one or more of, but is not limited to an audio recording, text, images, and a video recording. In particular, the access validation device 102 may automatically generate a plurality of metadata types associated with the multimedia content. Thereafter, based on the plurality of metadata types the access validation device 102 may provide a plurality of options to a user. From the provided plurality of options, the user may select one or more options according to the user's requirement. The access validation device 102 may then analyze the user details in order to check whether the user has rights to access one or more conference data streams associated with the one or more options selected by the user.

The one or more conference data streams may be extracted from the multimedia content and may represent a portion of the conference data. Thereafter, the access validation device 102 validates the user access based on the analyzed user details and the one or more options selected by the user. Thus, the system 100 may resolve problems in the conventional methods and systems by automatically displaying appropriate and relevant sections of the multimedia content to a user with high accuracy. This is further explained in detail in conjunction with FIG. 2 to FIG. 7.

Examples of the access validation device 102 may include, but are not limited to, a server, a desktop, a laptop, a notebook, a tablet, a smartphone, a mobile phone, an application server, or the like. The access validation device 102 may include a memory 104, one or more processors 106, and a display 108. The display 108 may further include a user interface 110. A user or an administrator may interact with the access validation device 102 and vice versa through the display 108. By way of an example, the display 108 may be used to display results of analysis performed by the access validation device 102, to the user. By way of another example, the user interface 110 may be used by the user to provide inputs to the access validation device 102. Thus, for example, in some embodiments, the access validation device 102 may ingest the conference data and one or more selected options provided by the user/administrator via the user interface 110. Further, for example, in some embodiments, the access validation device 102 may render results (e.g., selected conference data streams of the multimedia content) to the user/administrator via the user interface 110. In some embodiments, the user/administrator may provide inputs to the access validation device 102 via the user interface 110.

The memory 104 may store instructions that, when executed by the processors 106, may cause the processors 106 to manage user access to the multimedia content using metadata, in accordance with some embodiments. As will be described in greater detail in conjunction with FIG. 2 to FIG. 7, in order to manage user access to the multimedia content, the processor 106 in conjunction with the memory 104 may perform various functions including conference recording, contexts identification, generating metadata types, providing a plurality of options to the users, receiving selected options from the users, and validating the user access to one or more conference data streams.

The memory 104 may also store various data (e.g. multimedia content, extracted conference data streams, training and testing data for a Machine Learning (ML) model, contexts, various metadata types etc.) that may be captured, processed, and/or required by the access validation device 102. The memory 104 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.)

Further, the access validation device 102 may interact with a server 112 or input devices 116 over a communication network 118 for sending and receiving various data. The communication network 118, for example, may be any wired or wireless communication network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS).

By way of an example, in some embodiments, the access validation device 102 may receive the conference data from the server 112. The server 112 may be configured to host various types of conferences. The server 112 may further include a database 114, which may store information related to various conferences hosted on the server 112. Further, the input devices 116 may include, but may not be limited to, a desktop, a laptop, a notebook, a netbook, a tablet, a smartphone, a remote server, a mobile phone, or another computing system/device. The access validation device 102 may validate the user access over one of these input devices 116.

Figure 2:
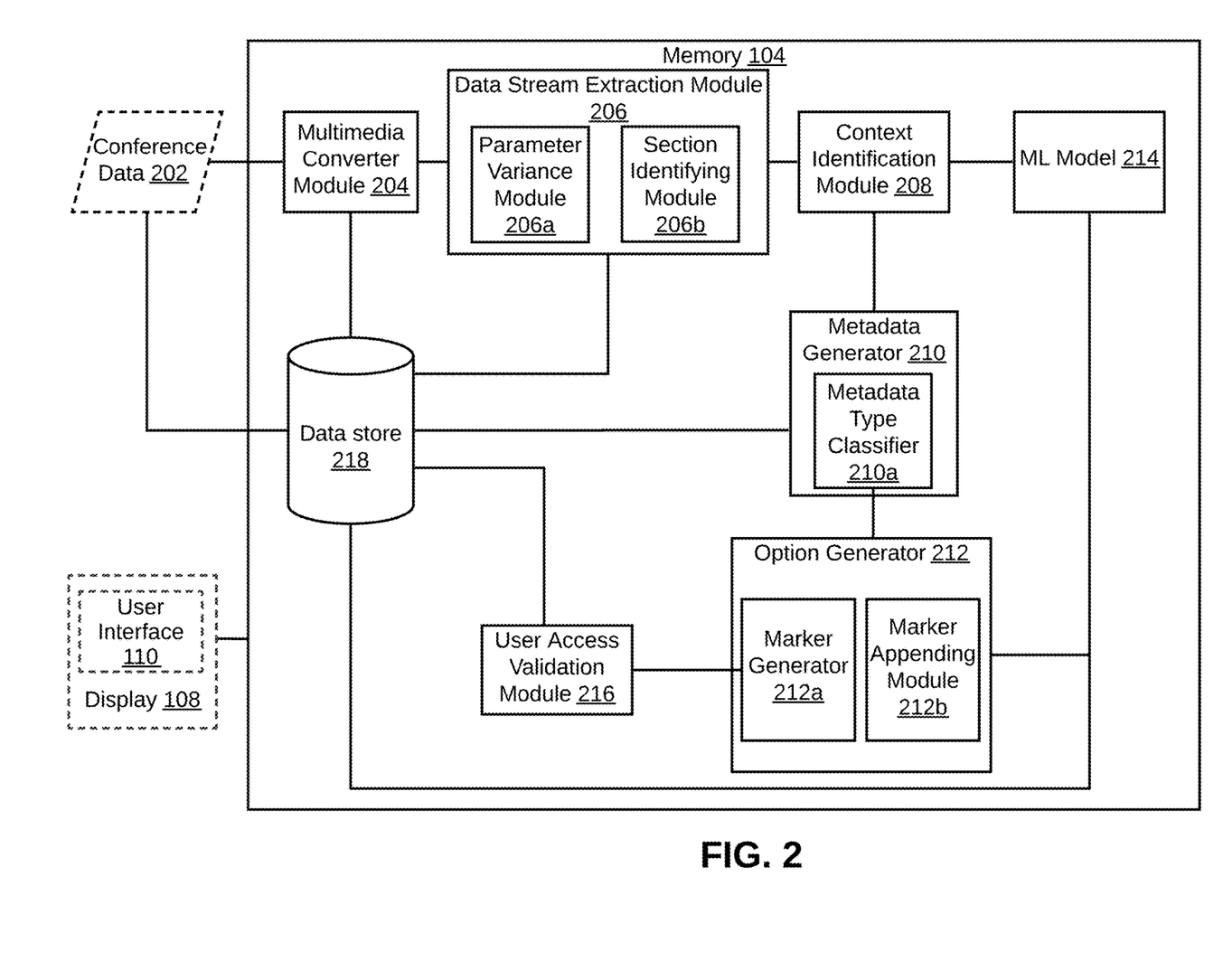
FIG. 2 is a functional block diagram of various modules within a memory of an access validation device configured to manage user access to a multimedia content for an online conference using metadata, in accordance with an embodiment.

Referring now to FIG. 2, a block diagram of various modules within the memory 104 of the access validation device 102 configured to manage user access to a multimedia content for an online conference using metadata is illustrated, in accordance with an embodiment. Initially, the conference data 202 extracted by the access validation device 102 (either from the server 112 or one of the input devices 116) may be provided to the memory 104. In order to generate metadata based options corresponding to various conference data streams and to handle user access to one or more conference data streams, the access validation device 102 may include a multimedia convertor module 204, a data stream extraction module 206, a context identification module 208, a metadata generator 210, an option generator 212, an ML model 214, a user access validation module 216, and a data store 218. Thus, the conference data 202 may be used as an input to the access validation device 102, which may then provide appropriate conference data streams as an output to the user via the user interface 110 over the display 108.

In some embodiments, during an online conference the conference data 202 may be utilized and the multimedia convertor module 204 may convert the conference data 202 into a multimedia content. In some other embodiments, the multimedia convertor module 204 may record the conference data 202 as the multimedia content. The online conference, for example, may include, but is not limited to a technical discussion, a client meeting, a team meeting, and an internal meeting. Additionally, the multimedia content, for example, may include one or more of, but is not limited to an audio recording, text, images, and a video recording. By way of an example, the multimedia convertor module 204 may create a viewable video or an audio file. Additionally, the multimedia convertor module 204 may be capable of separating audio and video. The multimedia convertor module 204 may store the recording of the conference data 202 (i.e., the multimedia content) in the data store 218. The multimedia convertor module 204 may further be communicatively coupled to the data stream extraction module 206 and thus may directly provide the multimedia content to the data stream extraction module 206.

The data stream extraction module 206 may receive the multimedia content shared by the multimedia convertor module 204. Alternatively, the data stream extraction module 206 may directly utilize the conference data 202. The data stream extraction module 206 may also be communicatively coupled to the context identification module 208 and the data store 218, which may be used to store intermediate results of the data stream extraction module 206. The data stream extraction module 206 may extract a plurality of conference data streams from the multimedia content. To this end, the data stream extraction module 206 may include a parameter variance module 206a and a section identifying module 206b.

In some embodiments, the parameter variance module 206a may analyze a change in values of one or more conference parameters associated with the multimedia content. The conference parameters may correspond to one or more predefined data, which may include, but is not limited to organization data, one or more topics, a type of content, user roles and access rights derived from the organization data, speaker details, participant details, and user defined data. As conference parameters may be based on the user defined data, a user may be able to customize conference parameters. Based on the analysis, the parameter variance module 206a may generate an output. Based on the output of the parameter variance module 206a, the section identifying module 206b may identify a plurality of sections in the multimedia content. Each of the plurality of sections may then be used for extracting the plurality of conference data streams from the multimedia content, which are then shared with the context identification module 208. In other words, each of the plurality of conference data streams may have direct correspondence with a section of the plurality of sections.

With regards to the extracted plurality of conference data streams, the context identification module 208 may detect a plurality of contexts for each of the plurality of conference data streams. To identify the plurality of contexts, the context identification module 208 may access the one or more predefined data. Additionally, the context identification module may communicate with the ML model 214, which may help in identifying the plurality of contexts with great accuracy. In some embodiment, the ML model 214 may be trained to identify the plurality of contexts based on a plurality of predefined rules. The predefined rules, for example, may include, but are not limited to tone and pitch of a speaker's voice, details of speakers, pauses taken by a speaker while speaking, specific words or terms (spoken or written), or specific user actions. Once the plurality of contexts are identified, they may be shared with the metadata generator 210 that is communicatively coupled to the context identification module 208.

The metadata generator 210 may be configured to collect the plurality of contexts for each of the plurality of conference data streams from the context identification module 208. The metadata generator 210 may then generate a plurality of metadata types based on the received plurality of contexts. To this end, the metadata generator 210 may include a metadata type classifier 210a that classifies metadata into various categories to create a plurality of metadata types. It should be noted that the metadata types may include at least one of a word cloud metadata, a topic based metadata, a task based metadata, a speaker based metadata, a role specific metadata, and a participant based metadata. The metadata types may additionally include a screen share based metadata, i.e., metadata associated with presence of screen sharing in one or more of the plurality of conference data streams. The metadata types may include metadata based on most liked content, which may correspond to speech of speakers or content displayed on the screen that is liked by one or more attendees. The metadata types may further include disruption metadata, which may correspond to sections within one or more of the plurality of conference data streams where a speaker's voice may not be clear or may break due to bad network connectivity, and where a content (whether verbal, textual, or a combination thereof) may have been repeated by a speaker. The disruption metadata may be identified by the ML model 214. The metadata types may further include geographic location metadata, which may correspond to geographic locations of each speaker.

In some embodiments, each of the plurality of metadata types may be associated with a conference data stream. The metadata generator 210 may also store the generated metadata types in the data store 218. The metadata generator 210 may then access the stored metadata types from the data store 218 and may associate one or more of the plurality of metadata types with the plurality of conference data streams. The metadata generator 210 may further be communicatively coupled to the option generator 212.

The option generator 212 may be configured to generate a plurality of options corresponding to the plurality of metadata types. By generating the plurality of options via the option generator 212, the system 100 enables the user to select a section of interest from the plurality of conference data streams. By way of an example, when a user requires to listen to or watch a section that correspond to speakers of a specific country (for example, Spanish speakers), the user may select an option that corresponds to geographic location metadata for that country. By way of another example, when the user wants to access sections that include the most liked speech by a speaker, the content based metadata may be useful and the user may select the corresponding option generated based on the content based metadata.

In some embodiments, to generate the plurality of options, the ML model 214 may be utilized. The ML model 214 is trained based on historic data and details associated with a user, such that, the ML model 214 prioritizes the options that are usually accessed by the user. In some other embodiments, the ML model 214 may be trained based on various rules according to requirement.

The option generator 212 may further include two modules, i.e., a marker generator 212a and a marker appending module 212b. The marker generator 212a may generate a plurality of markers (or metadata cards) associated with each of the plurality of metadata types. The marker appending module 212b may then append each of the plurality of markers to the plurality of conference data streams in the multimedia content at associated sections in the multimedia content. Each of the plurality of markers may be used as an indication to a user for accessing the multimedia content.

The user access validation module 216 may be configured to extract details associated with a user. Further, based on the user details, the user access validation module 216 verifies whether the user has rights to access one or more conference data stream or a portion thereof, based on the one or more selected options. Based on the verification, the user access validation module 216 may generate an outcome. Accordingly, access to the one more conference data streams or a portion thereof may be provided to the user over the display 108 via the user interface 110. In other words, the user access validation module 216 may validate the user's access to one or more of the plurality of conference data streams based on the one or more selected options and access rights associated with the user. It may be noted that the access rights may be derived from an organization data. By way of an example, in an organization different roles may be assigned to users and each role may further be associated with access rights to various data. The organizational data may include such details, i.e., role assigned to a user and access rights associated with that role. By way of another example, in an organization, users may assigned to different business units or projects. In this case, access rights of a user may vary based on allocated business unit or project. The organizational data may include details of users mapped to associated business units or projects.

The data store 218 may be operatively coupled to various modules of the memory 104. The data store 218 may store, and manage the outputs generated by the various modules 204-216. Further, the data store 218 may store all the intermediate results generated by the various module 204-216. Therefore, on requirement, each module is capable of extracting or storing required information in the data store 218.

It should be noted that the access validation device 102 may be implemented in programmable hardware devices such as programmable gate arrays, programmable array logic, programmable logic devices, or the like. Alternatively, the access validation device 102 may be implemented in software for execution by various types of processors. An identified engine/module of executable code may, for instance, include one or more physical or logical blocks of computer instructions which may, for instance, be organized as an object, module, procedure, function, or other construct. Nevertheless, the executables of an identified engine/module need not be physically located together but may include disparate instructions stored in different locations which, when joined logically together, comprise the identified engine/module and achieve the stated purpose of the identified engine/module. Indeed, an engine or a module of executable code may be a single instruction, or many instructions, and may even be distributed over several different code segments, among different applications, and across several memory devices.

As will be appreciated by one skilled in the art, a variety of processes may be employed for managing user access to a multimedia content for an online conference. For example, the exemplary system 100 and associated access validation device 102 may manage the user access using metadata, by the process discussed herein. In particular, as will be appreciated by those of ordinary skill in the art, control logic and/or automated routines for performing the techniques and steps described herein may be implemented by the system 100 and the associated access validation device 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all the processes described herein may be included in the one or more processors on the system 100.

Figure 3:
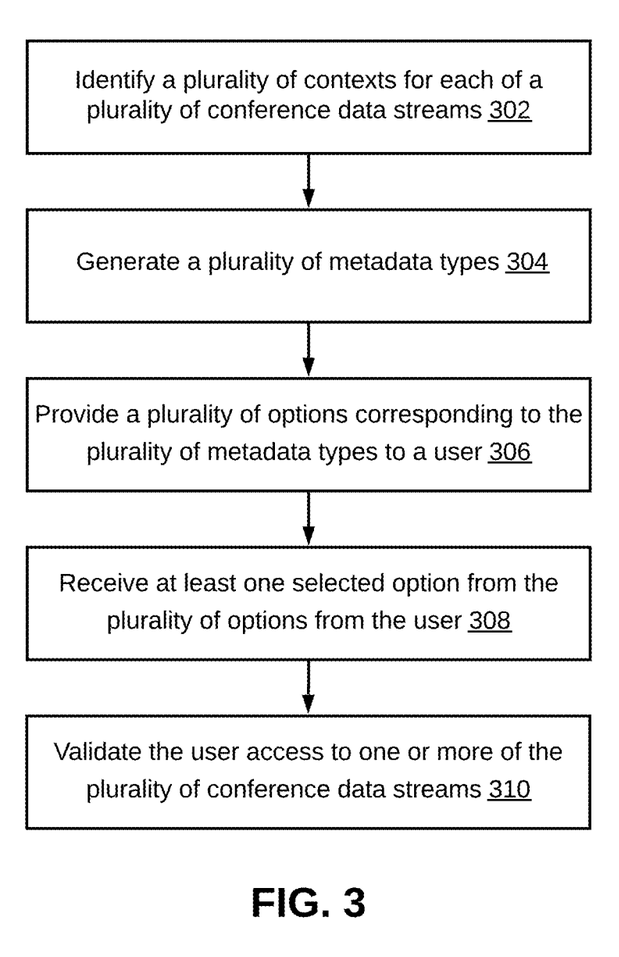
FIG. 3 is a flowchart of a method for managing user access to a multimedia content for an online conference using metadata, in accordance with an embodiment.

Referring now to FIG. 3, a method for managing user access to the multimedia content for the online conference using metadata depicted is via a flowchart, in accordance with an embodiment. Each step of the method may be executed by the access validation device 102. At step 302, a plurality of contexts may be identified, using a ML model (for example, the ML model 214). It should be noted that the plurality of contexts may be identified for each of a plurality of conference data streams extracted from the multimedia content. One or more predefined data may be utilized for identifying the plurality of contexts. It should also be noted that the one or more predefined data may include the organization data, one or more topics, type of content, user roles and access rights derived from the organization data, speaker details, participant details, and user defined data. In some embodiments, the ML model may be trained to identify plurality of contexts based on a plurality of predefined rules. The predefined rules, for example, may include, but are not limited to a speaker's voice tone and pitch, details of speakers, pauses taken by a speaker while speaking, specific words or terms (spoken or written), or specific user actions.

At step 304, a plurality of metadata types may be generated. In some embodiments, for generating the plurality of metadata types, the plurality of contexts associated with each of the plurality of conference data streams may be considered. It should be noted that the plurality of metadata types may include one or more of a word cloud metadata, a topic based metadata, a task based metadata, a speaker based metadata, a role specific metadata, a screen share based metadata, metadata based on most liked content, disruption metadata, geographic location metadata, and a participant based metadata. This has already been explained in detail in conjunction with FIG. 2.

At step 306, a plurality of options may be provided to the user. The plurality of options may correspond to the plurality of metadata types. Additionally, it should be noted that the user may access a section of interest in the plurality of conference data streams using the plurality of options. In some embodiments, the ML model may be employed to generate the plurality of options. This has already been explained in detail in conjunction with FIG. 2.

At step 308, one or more selected options may be received from the user. It should be noted that the user has to select one or more options associated with the sections of interest so that at least one selected option may be received by the access validation device 102. At step 308, the user access to one or more of the plurality of conference data streams may be validated. The access validation may be based on the one or more selected options and access rights associated with the user. It may also be noted that the access rights may be derived from an organization data. This has already been explained in detail in conjunction with FIG. 2.

Figure 4:
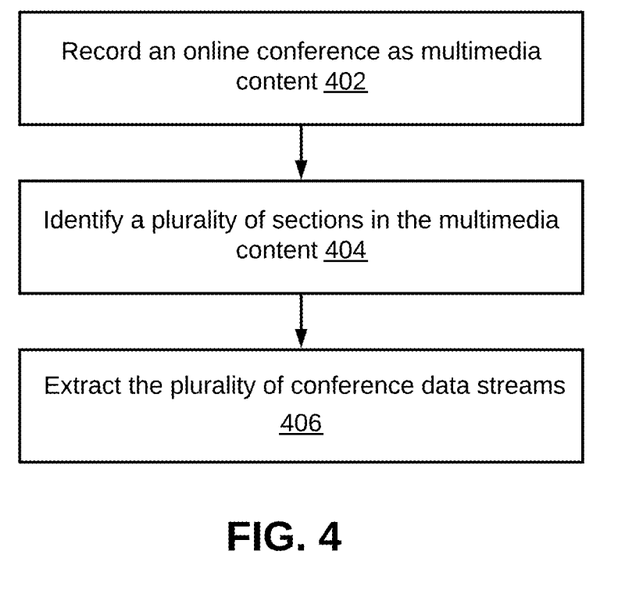
FIG. 4 is a flowchart of a method for extracting various conference data streams from a multimedia content, in accordance with an embodiment.

Referring now to FIG. 4, a method for extracting conference data streams from a multimedia content is illustrated, in accordance with an embodiment. In some embodiments, steps 402-406 may be performed by the multimedia converter module 204 and the data stream extraction module 206 within the access validation device 102. At step 402, the online conference may be recorded as the multimedia content. It may be noted that the multimedia content may include at least one of an audio recording, text, images, and a video recording.

Thereafter, at step 404, a plurality of sections in the multimedia content may be identified using the section identifying module 206*b*. For identifying the plurality of sections in the multimedia content a change in values of one or more conference parameters from a plurality of conference parameters may be analyzed by the parameter variance module 206*a*. It may be noted that the plurality of conference parameters correspond to one or more predefined data. At step 406, based on the identified plurality of sections, the plurality of conference data streams may be extracted. This has already been explained in detail in conjunction with FIG. 2.

Figure 5:
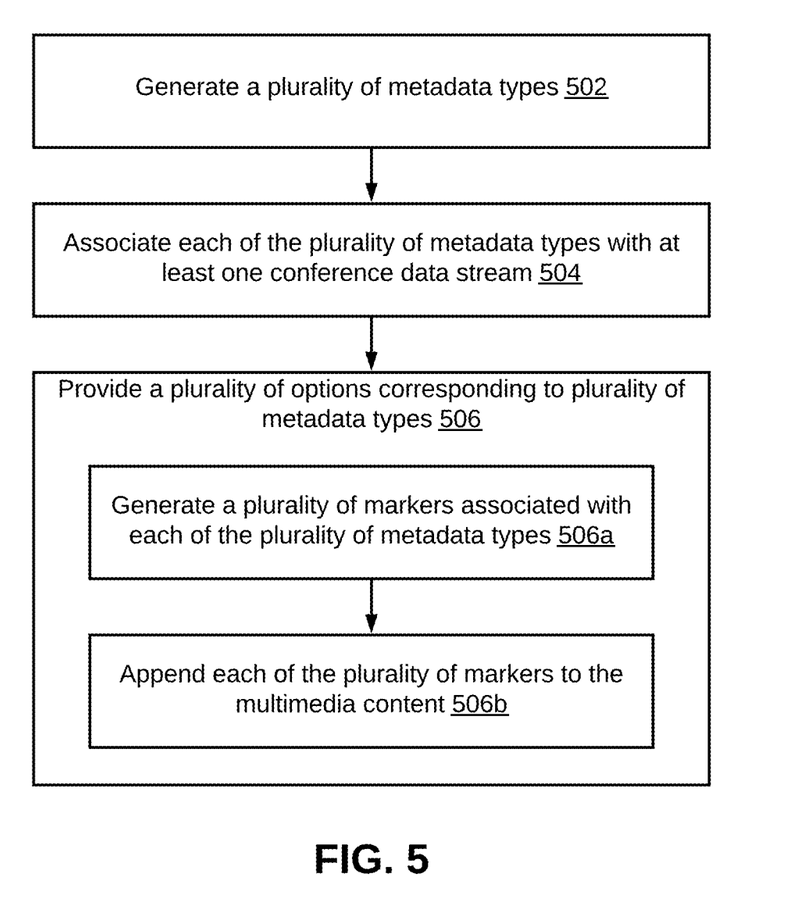
FIG. 5 is a flowchart of a method for providing a plurality of options to a user to access a multimedia content for an online conference, in accordance with an embodiment.

Referring now to FIG. 5, a method for providing a plurality of options to a user is depicted via a flowchart, in accordance with an embodiment. In some embodiments, steps 502-506 may be performed by the access validation device 102. At step 502, the plurality of metadata types may be generated based on a plurality of contexts associated with each of a plurality of conference data streams. Further, at step 504, each of the plurality of metadata types may be associated with one or more conference data stream from the plurality of conference data streams.

At step 506, the plurality of options may be generated based on the plurality of metadata types. The step 506 may further include sub steps 506*a* and 506*b* that may be performed by the marker generator 212*a* and the marker appending module 212*b*, respectively. At step 506*a*, a plurality of markers (or metadata cards) may be generated. It should be noted that the plurality of markers may be associated with each of the plurality of metadata types. At step 506*b*, each of the plurality of markers may be appended to the multimedia content. It should also be noted that the plurality of markers may be appended at associated sections in the multimedia content. This has already been explained in detail in conjunction with FIG. 2.

Figure 6:
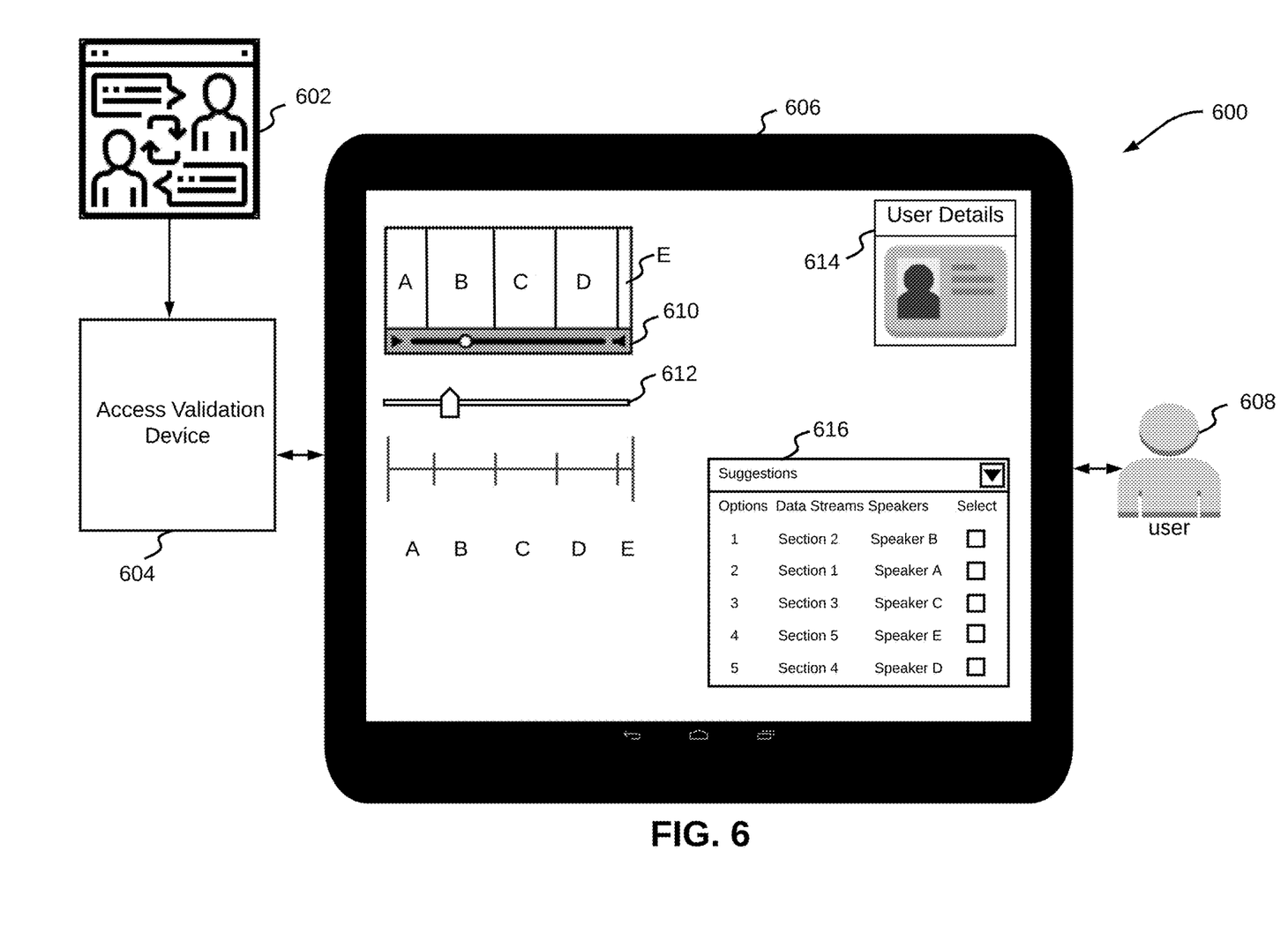
FIG. 6 is an exemplary system providing user access management for an online conference, in accordance with an exemplary embodiment.

Referring now to FIG. 6, an exemplary system 600 providing user access management for an online conference 602 is illustrated, in accordance with an exemplary embodiment. The system 600 includes an access validation device 604 (analogous to the access validation device 102), a display module 606, and a user 608. The online conference 602 may be any type of meeting that includes a total five speakers, for example, speakers 'A', 'B', 'C', 'D', and 'E'. The online conference 602 may be recorded by the access validation device 604 and may then be processed further to the display module 606. The display module 606, for example, may be display of a laptop, a smartphone, a desktop, a tablet, or a phablet. As explained in detail in FIG. 2 and FIG. 4, the multimedia convertor module 204 within the access validation device 604 records the conference data 602. The display module 606 may display the conference data 602 as a video file 610, which is the multimedia content in this exemplary embodiment. It may be apparent from the illustration that the video file 610 may be a combination of multiple conference data streams extracted by the access validation device 604.

As illustrated, in this exemplary embodiment, each conference data stream may correspond to a speaker. Since there are five speakers, there may be a total of five sections, i.e., 'section 1', 'section 2', 'section 3', 'section 4', and 'section 5' corresponding to five different conference data streams. A conference data stream associated with the 'section 1' may include data corresponding to the speaker 'A' and a conference data stream associated with the 'section 2' may include data corresponding to the speaker 'B'. Similarly, all other conference data streams associated with remaining sections may be associated with remaining respective speakers. A slider 612 that is appended with markers or metadata card (which correspond to metadata types) at different sections of the video file 610 may be provided in order to let a user directly access a required section from various sections of the video file 610, after access validation of the user 608.

The user 608 may be capable of interacting with the video file 610 using the slider 612 via the display module 606, which may be a touch screen. It will be apparent to a person skilled in the art that the current exemplary embodiment is directed to providing speaker specific sections of the video file 610, however, the sections may be provided based on one or more topics or a type of content.

The user 608 may be required to enter his/her user details 614 via a user interface on the display module 606 in order to access one or more sections of the video file 610. Alternatively, the user 608 may simply provide his/her login details and the user details 614 may automatically be extracted from an organization data. The user details 614 may include, but are not limited to a user ID, name of an organization, a password, and a role of the user in the organization. After the user details 614 are received, a list of suggestions 616 may be displayed on the display module 606. The list of suggestions 616 may include five options that may be generated by an option generator (such as, the option generator 212) in the access validation device 604. The list of suggestions 616 may include conference data streams, sections corresponding to the conference data streams, speakers associated with each section, and selection keys that enable selection of one or more options displayed in the list of suggestions 616. The list of suggestions 616 may be generated using the ML model 214. When the list of suggestions 616 is generated using the ML model 214, the video streams or sections that are usually accessed by the user 608, may be provided at top of the list of suggestions 616. In other words, the ML model 214 may prioritize or order the list of suggestions 616 based on preferences or historic usage of the user 608.

Figure 7:
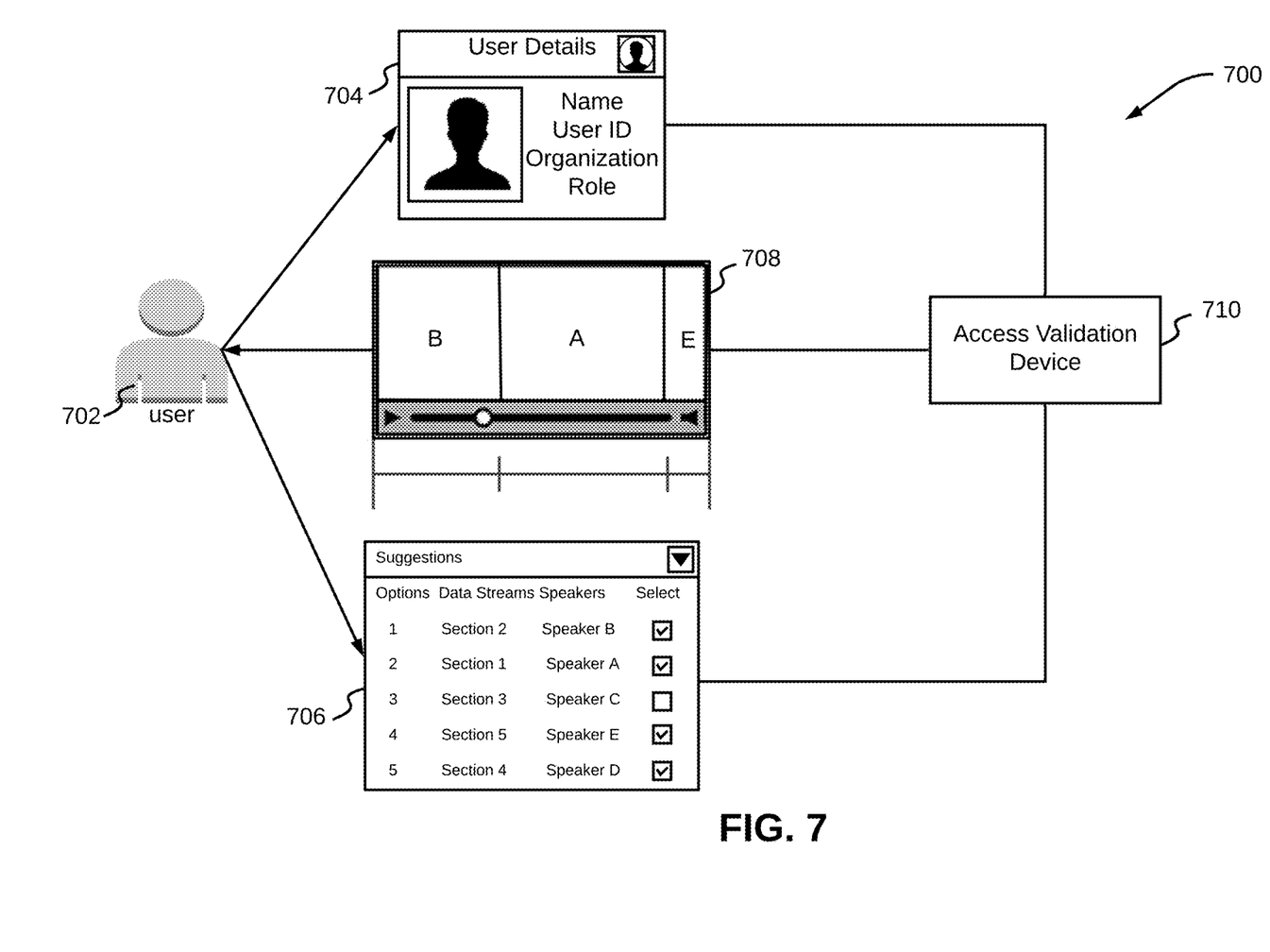
FIG. 7 is an exemplary system displaying various conference data streams based on options selected by a user and access rights of the user, in accordance with an exemplary embodiment.

Referring now to FIG. 7, an exemplary system 700 displaying various conference data streams based on options selected by a user 702 and access rights of the user 702 is illustrated, in accordance with an exemplary embodiment. The system 700 may include user details 704 (analogous to the user details 614) provided by the user 702, a list of suggestions 706 (analogous to the list of suggestions 616), a video file 708 as a multimedia content, and an access validation device 710 (analogous to the access validation device 604). The user details 704 may include a username, user ID, name of an organization, and role of the user 702 in that organization. Based on the user details 704 (whether provided by the user 702 or automatically extracted), the list of suggestions 706 may be reflected on a display of a display module (for example, the display module 606).

Now, the user 702 may have to choose one or more options from the plurality of options provided in the list of suggestions 706. The user 702 may select four options, i.e., options 1, 2, 4, and 5 from the total five options based on a current user requirement. The access rights may be determined based on the user details 704. Before providing access to the user 702, the access validation device 710 analyses the user details 704 and determines whether the user 702 has access rights for the selected options or not. Based on the selected options and the access rights, the access validation device 710 may determine that the user 702 does not have rights to access the section 4 aligned with the option 4 selected by the user. Accordingly, the access validation device 710 may send a signal to the display module. Therefore, the video file 708 that is to be rendered to the user 702 may only include three conference data streams, i.e., section 2, section 1, and section 5 corresponding to the selected options 1, 2, and 5.

By way of an example of the system and method described by way of the above figures, a user may be capable of selecting one or more metadata cards (or markers) corresponding to a plurality of metadata types. A conference, for example, may be a meeting and the context of the meeting may be pre-sales. The metadata types may include metadata cards on all speakers (for example, participants from both customer's organization and seller's organization), metadata cards on all customer's organization speakers, metadata cards on all seller's organization speakers, a word cloud, and metadata cards on all customer's organization participants screen share. The user may be interested in accessing all the recording portions, where a customer is sharing the screen and discussing about a topic Single Sign On (SSO). Thus, the user may select a mixture of metadata cards that may include two customer's organization speakers, five customer's organization screen shares, and four word SSOs. Thus, the outcome may be a unison of selection of such mixed metadata cards.

For the same pre-sales meeting, in another scenario, the user may be interested to apply access based rights on few portions of the whole video stream. These portions may include all customer participants' screens that are to be censored. In this case, the user may select five metadata cards for customer organization screen share and access rights for the video stream, such that, audio may still be available without access rights. Thus, the outcome may be a unison of selection of such metadata cards and access rights.

Various embodiments provide method and system for managing user access to multimedia content for online conferences using metadata. The disclosed method and system may help to automate the process of managing user access to a multimedia content for an online conference using metadata. The disclosed method and system may also provide seamless access to some specific portions of the multimedia content, which the user is interested to selectively view. Further, as the system and method utilized a ML model, the accuracy of providing selective access to a user may be amplified to a great extent. Additionally, high security to access the multimedia content is provided as the system verifies the access rights of the user corresponding to the selected options and only based on validation of user credential, a user is allowed to access a portion of the multimedia content. Moreover, the disclosure provides some advantages like easy and organized search, and ease in accessing an interested portion of the multimedia content using context specific metadata cards or markers.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous.

Also, the inclusion of a feature in one category of claims does not imply a limitation to this category, but rather the feature may be equally applicable to other claim categories, as appropriate.

What is claimed is:

1. A method for managing user access to a multimedia content for an online conference using metadata, the method comprising:
 identifying a plurality of contexts for each of a plurality of conference data streams extracted from the multimedia content based on at least one predefined data, using a Machine Learning (ML) model;
 generating a plurality of metadata types based on the plurality of contexts associated with each of the plurality of conference data streams;
 providing, to a user, a plurality of options corresponding to the plurality of metadata types for accessing a section of interest in the plurality of conference data streams, using the ML model;
 receiving from the user, at least one selected option from the plurality of options;
 validating the user access to one or more of the plurality of conference data streams that correspond to the at least one selected, wherein validating the user access comprises:
  extracting details associated with the user;
  deriving, from an organization data, access rights associated with the user based on the extracted details, wherein the organization data comprises a role assigned to the user and access rights associated with the role, wherein the access rights define access of various data to the user; and
  verifying whether the user has rights to access the one or more of the plurality of conference data streams, based on the access rights derived from the organization data; and
 providing the user access to the one or more of the plurality of conference data streams, based on validating the user access.

2. The method of claim 1, further comprising recording the online conference as the multimedia content, wherein the multimedia content comprises at least one of an audio recording, text, images, and a video recording.

3. The method of claim 2, further comprising:
 identifying a plurality of sections in the multimedia content based on a change in values of at least one parameter from a plurality of conference parameters; and
 extracting the plurality of conference data streams based on the identified plurality of sections.

4. The method of claim 3, wherein the at least one predefined data comprises the organization data, at least one topic, type of content, user roles and access rights derived from the organization data, speaker details, participant details, and user defined data.

5. The method of claim 4, wherein the plurality of conference parameters corresponds to the at least one predefined data.

6. The method of claim 1, wherein the metadata types comprise at least one of a word cloud metadata, a topic based metadata, a task based metadata, a speaker based metadata, a role specific metadata, a screen share based metadata, metadata based on most liked content, disruption metadata, geographic location metadata, and a participant based metadata.

7. The method of claim 1, further comprises associating each of the plurality of metadata types with at least one conference data stream from the plurality of conference data streams.

8. The method of claim 1, wherein providing the plurality of options further comprises:
 generating a plurality of markers associated with each of the plurality of metadata types; and
 appending each of the plurality of markers to the multimedia content at associated sections in the multimedia content.

9. The method of claim 1, further comprising training the ML model to identify the plurality of contexts based on a plurality of predefined rules.

10. A system for managing user access to a multimedia content for an online conference using metadata, the system comprising:
 a processor; and
 a memory communicatively coupled to the processor, wherein the memory stores processor-executable instructions, which, on execution, causes the processor to:
 identify a plurality of contexts for each of a plurality of conference data streams extracted from the multimedia content based on at least one predefined data, using a Machine Learning (ML) model;
 generate a plurality of metadata types based on the plurality of contexts associated with each of the plurality of conference data streams;
 provide, to a user, a plurality of options corresponding to the plurality of metadata types for accessing a section of interest in the plurality of conference data streams, using the ML model;
 receive from the user, at least one selected option from the plurality of options; and
 validate the user access to one or more of the plurality of conference data streams that correspond to the at least one selected, wherein validating the user access comprises:
  extracting details associated with the user;
  deriving, from an organization data, access rights associated with the user based on the extracted details, wherein the organization data comprises a role assigned to the user and access rights associated with the role, wherein the access rights define access of various data to the user; and
  verifying whether the user has rights to access the one or more of the plurality of conference data streams, based on the access rights derived from the organization data; and
 provide the user access to the one or more of the plurality of conference data streams, based on validating the user access.

11. The system of claim 10, wherein the processor instructions further cause the processor to record the online conference as the multimedia content, and wherein the multimedia content comprises at least one of an audio recording, text, images, and a video recording.

12. The system of claim 11, wherein the processor instructions further cause the processor to:
 identify a plurality of sections in the multimedia content based on a change in values of at least one parameter from a plurality of conference parameters; and
 extract the plurality of conference data streams based on the identified plurality of sections.

13. The system of claim 12, wherein the at least one predefined data comprises the organization data, at least one topic, type of content, user roles and access rights derived from the organization data, speaker details, participant details, and user defined data.

14. The system of claim 13, wherein the plurality of conference parameters corresponds to the at least one predefined data.

15. The system of claim 10, wherein the metadata types comprise at least one of a word cloud metadata, a topic based metadata, a task based metadata, a speaker based metadata, a role specific metadata, a screen share based metadata, metadata based on most liked content, disruption metadata, geographic location metadata, and a participant based metadata.

16. The system of claim 10, wherein the processor-executable instructions further cause the processor to associate each of the plurality of metadata types with at least one conference data stream from the plurality of conference data streams.

17. The system of claim 10, wherein the processor-executable instructions further cause the processor to provide the plurality of options by:
generating a plurality of markers associated with each of the plurality of metadata types; and
appending each of the plurality of markers to the multimedia content at associated sections in the multimedia content.

18. The system of claim 10, wherein the processor-executable instructions further cause the processor to train the ML model to identify the plurality of contexts based on a plurality of predefined rules.

19. A non-transitory computer-readable medium storing computer-executable instructions for managing user access to a multimedia content for an online conference using metadata, the stored instructions, when executed by a processor, cause the processor to perform operations comprising:
identifying a plurality of contexts for each of a plurality of conference data streams extracted from the multimedia content based on at least one predefined data, using a Machine Learning (ML) model;
generating a plurality of metadata types based on the plurality of contexts associated with each of the plurality of conference data streams;
providing, to a user, a plurality of options corresponding to the plurality of metadata types for accessing a section of interest in the plurality of conference data streams, using the ML model;
receiving from the user, at least one selected option from the plurality of options; and
validating the user access to one or more of the plurality of conference data streams that correspond to the at least one selected, wherein validating the user access comprises:
extracting details associated with the user;
deriving, from an organization data, access rights associated with the user based on the extracted details, wherein the organization data comprises a role assigned to the user and access rights associated with the role, wherein the access rights define access of various data to the user; and
verifying whether the user has rights to access the one or more of the plurality of conference data streams, based on the access rights derived from the organization data; and
providing the user access to the one or more of the plurality of conference data streams, based on validating the user access.

20. The non-transitory computer-readable medium of claim 19, further comprises:
recording the online conference as the multimedia content, wherein the multimedia content comprises at least one of an audio recording, text, images, and a video recording;
identifying a plurality of sections in the multimedia content based on a change in values of at least one parameter from a plurality of conference parameters; and
extracting the plurality of conference data streams based on the identified plurality of sections.

\* \* \* \* \*